J. C. SHULTS.
LOCK NUT.
APPLICATION FILED FEB. 19, 1919.
1,309,421.
Patented July 8, 1919.
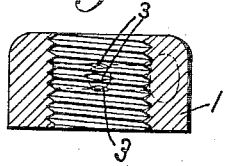
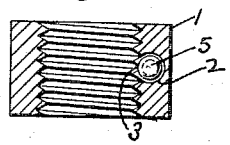
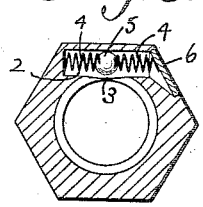
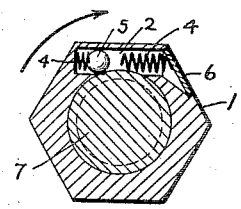
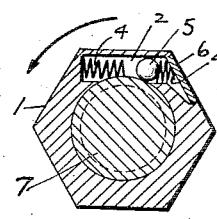
Inventor
James C. Shults,
By his Attorney

UNITED STATES PATENT OFFICE.

JAMES C. SHULTS, OF MEADVILLE, PENNSYLVANIA.

LOCK-NUT.

1,309,421.  Specification of Letters Patent.  Patented July 8, 1919.

Application filed February 19, 1919. Serial No. 278,055.

*To all whom it may concern:*

Be it known that I, JAMES C. SHULTS, a citizen of the United States, and a resident of Meadville, in the county of Crawford and State of Pennsylvania, have invented certain new and useful Improvements in Lock-Nuts, of which the following is a specification.

This invention relates to lock nuts, and has for its object to provide a simple and efficient lock nut which will not have exposed parts liable to get out of order or fill with dirt, nor will separate keys or tripping devices be required to take it off.

The invention differs from that class of lock nuts having a locking ball and a trip for releasing the ball operated from outside, and also a type of lock nut having a soft ball which is cut by the bolt thread when violently backed off, or else having a hard ball which flattens down and practically destroys the entire thread when backed off. The lock nut of this invention embodies an interior bore tangentially intersecting the thread bore and carrying a hard ball which can yieldingly move in either direction. It is moved out of the intersection by the bolt thread in screwing on, but engages the thread to resist backing off. By violently wrenching the nut, the ball cuts through or rolls over the top of the bolt thread for a slight distance only, and then the nut backs off in the ordinary manner without damaging or destroying the remainder of the thread, as shown in Figure 5. The same bolt can thus be used a number of times since the dent in the thread made in backing off the nut will rarely come twice at the same point on the bolt thread, and this can be obviated by adding or taking out a washer where a bolt is re-used. The nut can be used indefinitely, as neither the hard locking ball nor the nut thread is damaged in repeated use.

In the accompanying drawings,

Fig. 1 is a sectional elevation,

Fig. 2 is a sectional elevation at a right angle to Fig. 1,

Fig. 3 is a sectional plan,

Fig. 4 shows the position in screwing on, and

Fig. 5 shows the position in backing off.

1 represents the nut of ordinary construction having for example the interior V-threads cut in the usual manner. Intersecting the interior threads is a tangential bore or chamber 2 so located as to come slightly inside the bottom of the thread. This intersection 3 will squarely cut into one thread and may slightly cut into the thread on each side, as shown, or may cut into two threads evenly, this depending upon the cross section of the bore which will ordinarily be round because drilled in from one side. Mounted in the bore 2 between springs 4, 4, is the hard locking ball 5, which is normally held in position at the intersection 3 by the opposing forces of the springs 4. The springs and interposed ball are put in the bore and then it is permanently closed by the plug 6.

When the nut is screwed on the bolt 7, the bolt thread engages the ball and pushes it to one side of the intersection 3 against one of the springs 4, the nut thus screwing on in the ordinary manner without any preliminary setting of the trips or other devices, as seen in Fig. 4. This compressed spring causes the ball to instantly bind between the bolt thread projecting into the bore at the intersection and the outer side of the bore to oppose backing off, so that the nut cannot back off either from vibration or the elasticity of the bolt when under tension with the nut set up tight, or both, or even when the nut is not set up tight, as in the case of a pivot bolt. The forces due to vibration or elasticity tending to back off the nut will simply set the locking ball tighter. When the nut is to be backed off, it is only necessary to give it a sudden wrench in the backing off direction, which causes the ball to roll or slide through the top of the bolt thread toward the opposite side of the bore, thereby relieving the locking spring of pressure, and causing the ball to be held out of operation during further backing off because of being moved behind the high point of the thread. The flattening of the thread where the ball rolls or slides over when the nut is violently wrenched backward only occurs for a slight distance because the bore extends on both sides of the intersection and crosses the thread at an angle depending upon the pitch of the thread and the direction of the bore. In other words, the ball is not held by the end of the bore or slot on the top of the thread in backing off and compelled to grind down the entire thread to the end of the bolt, which not only prevents re-use of the bolt except within the undamaged thread, but would damage the nut thread as well. With this invention, the slight dent in the bolt thread top does not damage the nut thread, and with a close fitting nut will even be largely smoothed out by the nut. Thus the bolt is practically unimpaired for re-use, because it is practically impossible to stop the ball twice at the same point on the bolt, and even so, there is still holding power against accidental disengagement without another wrenching.

It will be seen that this nut can be manufactured very cheaply, is mechanically practicable, and can be used by anyone without previous instruction, it being observed that the nut is reversible and that either end can be started on the bolt without affecting the operation, so that by making the bore 2 nearer one end of the nut in cases where the bolt is to be repeatedly re-used, reversing the nut would in itself change the locking point on the bolt thread from previous points where the nut had been locked and then taken off, so that even without adding or removing washers, the reversibility of the nut permits repeated use of the same bolt with entire safety.

Although a V-thread and spherical ball are shown herein by way of example, the invention is not to be restricted thereto, as various other forms of threads may be used, and I intend to cover other than spherical shapes of balls capable of rolling or sliding momentarily over the thread within the term ball as used in this specification and the appended claims. Also, a single nut may be provided with more than one of the described yieldable locking devices.

What is claimed, is:

1. A lock nut having an interior chamber tangentially intersecting the thread inside the bottom thereof, and a locking member of hard material normally held on one side of said intersection and preventing backward rotation of the nut but adapted to cut through the top of the bolt thread and pass to the other side of the intersection to unlock when the nut is violently turned backward and further means for holding said locking member in contact with the bolt threads when said member has passed to said other side of the intersection.

2. A lock nut having an interior chamber tangentially intersecting the thread inside the bottom thereof, and a locking member normally held at the intersection of the chamber and the thread and adapted to be moved in the chamber toward one or the other side of said intersection to clear the thread according to the relative direction of rotation of the bolt and the nut when engaged and resilient means on each side of said locking member for returning same to normal position when moved therefrom.

3. A lock nut having an interior chamber tangentially intersecting the thread inside the bottom thereof, a spring on each side of the intersection, and a single locking member of hard material held in said bore between said springs so as to project inside the bottom of the thread to prevent movement of the nut in one direction while permitting movement in the opposite direction.

4. A reversible lock-nut having a bore containing an intermediately positioned locking device movable to either side away from locking position by relative movement of the nut and bolt.

5. A lock-nut having a chamber in communication with the threaded hole for the coöperating bolt, said chamber extending on each side thereof, a locking member in said chamber and movable from one side to the other of same, a yielding member in one side of said chamber to hold said locking member in contact with the threads of the coöperating bolt to prevent movement of the bolt in one direction, and a second yielding member in the opposite side of said chamber adapted to coöperate with the locking member when the latter is moved from the first mentioned side of the chamber.

6. A lock-nut having a threaded hole to receive a bolt, a bore intersecting the threaded hole at a point nearer one end face than the other, a locking member in said bore, and a plurality of yielding members contacting with said locking member to hold same at said point of intersection.

7. A lock-nut having a hole threaded to receive a bolt and having a chamber intersecting said hole, a single locking member, and means for holding said locking means centrally of the intersection while permitting yielding movement toward each end of said chamber.

Signed at Meadville, in the county of Crawford and State of Pennsylvania, this sixth day of Feb'y A. D. 1919.

JAMES C. SHULTS.

Witnesses:
ALBERT B. HUIDEKOPER,
J. H. GURNSEY.